United States Patent [19]

Quinn

[11] Patent Number: 5,761,385
[45] Date of Patent: *Jun. 2, 1998

[54] PRODUCT AND METHOD FOR EXTRACTING IMAGE DATA

[75] Inventor: Edward W. Quinn, Uniontown, Ohio

[73] Assignee: Loral Defense Systems, Akron, Ohio

[*] Notice: This patent issued on a continued prosecution application filed under 37 CFR 1.53(d), and is subject to the twenty year patent term provisions of 35 U.S.C. 154(a)(2).

[21] Appl. No.: 523,292

[22] Filed: Sep. 5, 1995

[51] Int. Cl.$^6$ .............................. G06F 1/00; G06F 15/18
[52] U.S. Cl. .............................. 395/22; 706/120; 706/15
[58] Field of Search ........................... 386/36–38, 19–21; 395/20–26, 27; 382/190, 155–160; 364/443

[56] References Cited

U.S. PATENT DOCUMENTS

| | | | |
|---|---|---|---|
| 4,876,651 | 10/1989 | Dawson et al. | 364/443 |
| 5,018,219 | 5/1991 | Matsuzaki et al. | 382/37 |
| 5,060,278 | 10/1991 | Fukumizu | 382/14 |
| 5,377,102 | 12/1994 | Nishiishigaki | 364/420 |
| 5,640,468 | 6/1997 | Hsu | 382/190 |

*Primary Examiner*—Tariq R. Hafiz
*Attorney, Agent, or Firm*—Renner, Kenner, Greive, Bobak, Taylor & Weber

[57] ABSTRACT

A system and associated method for extracting image data from a representation of a geographic area to generate a digital geographic database that can be accessed by computer programs to analyze various features contained within the database. In particular, the method includes scanning an image of a geographic area, manipulating the image into a processable format of a plurality of pixels, and submitting the format to a neural network with user-guided rules. The neural network classifies the format into a plurality of categories which comprise the geographic database, thus foregoing the need to manually identify and classify each pixel of the scanned image as having a particular feature. To enhance the processing and structure of the database, an optimizer and a combiner are employed. Accordingly, the method provides a digital geographic database for use by government agencies, urban planners and any user desiring to obtain information from a geographic representation.

16 Claims, 2 Drawing Sheets

PRODUCT AND METHOD FOR EXTRACTING IMAGE DATA

TECHNICAL FIELD

The present invention resides in the art of rapid and low cost generation of a geographic information system database. More particularly, the present invention is related to a product and method for extracting features from a hard copy map source to generate a digital geographic database that is conducive to computer analysis. Specifically, the present invention provides a product and method for employing image thresholding and processing techniques in conjunction with operator input received by a neural network to reduce the time required to convert a scanned map image into a geographical information system database.

BACKGROUND ART

Currently, most geographic information is preserved on hard copy maps, charts and other similar medium in a format which is easily understood by humans. Unfortunately, this geographic information is not in a form readily usable for computer analysis. The major benefit of storing a hard copy map in a digital geographic information system database is that certain desired geographic features can be searched for and located by analyzing the database. For example, corporations looking for an industrial site with access to major roads and bodies of water could search for these constraints in the digital database and quickly ascertain the availability of such sites. This digital geographic database could also be used by public utilities looking to locate transmission lines, by local governments to plan housing developments, by the military for strategic planning and so on.

Currently, the primary method of extracting information from paper maps relies on the use of data tablets to delineate the geographic position of objects and manually converting this information into digital form. This is typically done by an operator manually designating areas with a cursor, or puck, which has the appropriate function keys. Various computer interfaces have been developed for data collection and attribution to convert hard copy geographic information into a digital format. With the advent of image scanners, the ability to convert a hard copy map to a digital image has increased. Image scanners and a computer work station graphics screen allow a user to control all modes of the digitizing process, such as editing, data collection, merging, database management and the like. This has naturally led in attempts to directly use the image scanned into the computer work station as the information source for extraction of various map features.

Unfortunately, technical considerations prevent the complete realization of a highly automated method for converting hard copy map images into a digital format. For example, where features on a hard copy map are provided in half tones, in which discrete color combinations are used to represent intermediate colors, the system cannot determine what attribute to assign that particular feature. Additionally, the physical size of the scanning aperture, which mixes colors over a wide range at the boundaries of various objects, prevents a clear designation of the feature. As a result, the scanning of a color map image into a digital computer work station provides a series of pixels with color values ranging over a wide scale. Nor is there currently available a process for converting a digital image into a form more representative of that which is perceived by the human eye. As a result, significant errors are incurred in extracting separate image layers for each object type or map feature. This is especially true when map features such as vegetation and topographic contour lines overlap one another. Therefore, substantial manual intervention and editing operations are required in converting a hard copy map image into a digital format.

Based upon the foregoing, it is apparent that there is a need for a product and method to convert hard copy map images into a digital geographic information system database. Moreover, there is a need for a product and method to generate a digital geographic database wherein the amount of operator input to designate hard copy map features into a digital format is greatly reduced.

DISCLOSURE OF INVENTION

In light of the foregoing, it is a first aspect of the present invention to provide a product and method for generating a digital geographic information system database from any representation of a geographic area.

Another aspect of the present invention is to provide a product and method for generating a digital geographic information system database in which a scanned map image is thresholded, processed and then classified by a neural network for conversion to a digital image format.

Still a further aspect of the present invention is to provide a product and method for generating a digital geographic information system database wherein operator input is employed to teach the neural network to recognize and extract various features from the hard copy representation for conversion to a digital image format.

Yet another aspect of the present invention is to provide a product and method for generating a digital geographic information system database wherein an optimizer reduces the processing time required to convert a geographic representation into a digital format.

Still another aspect of the present invention is to provide a product and method for generating a digital geographic information system database wherein a digital image is generated that has separable attributes according to predetermined geographic categories which are combinable according to operator input.

The foregoing and other aspects of the invention which shall become apparent as the detailed description proceeds are achieved by a method for extracting optimal image data to generate a digital geographic database, comprising the steps of: scanning an image of a geographic area; manipulating the image into a processable format of a plurality of pixels; and receiving the processable format into a neural network having user-guided rules for classifying the processable format into a plurality of categories to generate a digital geographic database.

Still another aspect of the invention is provided by a method for generating a digital geographic database, comprising the steps of: scanning a representation of a geographic area, wherein the representation is converted to a plurality of pixels; identifying categories in the representation attributable to predetermined features; identifying sample pixels having the predetermined features; training an image classifier to identify remaining pixels as having predetermined features; and classifying the plurality of pixels according to the predetermined features to generate a digital geographic database.

Yet another aspect of the invention is a computer-readable medium for extracting image data from geographic representations to generate a digital geographic database, comprising: means for manipulating an image of a geographic area stored in a processable format of a plurality of pixels; means for receiving user-guided rules into a neural network, wherein said user-guided rules identify sample pixels within the processable format attributable to predetermined features; means for training the neural network to classify said processable format according to the predetermined features; and means for storing the classified processable format into a digital geographic database searchable by a user.

BRIEF DESCRIPTION OF THE DRAWINGS

FIG. 3 is a schematic representation of an optimizer pattern.

BEST MODE FOR CARRYING OUT THE INVENTION

Figure 1:
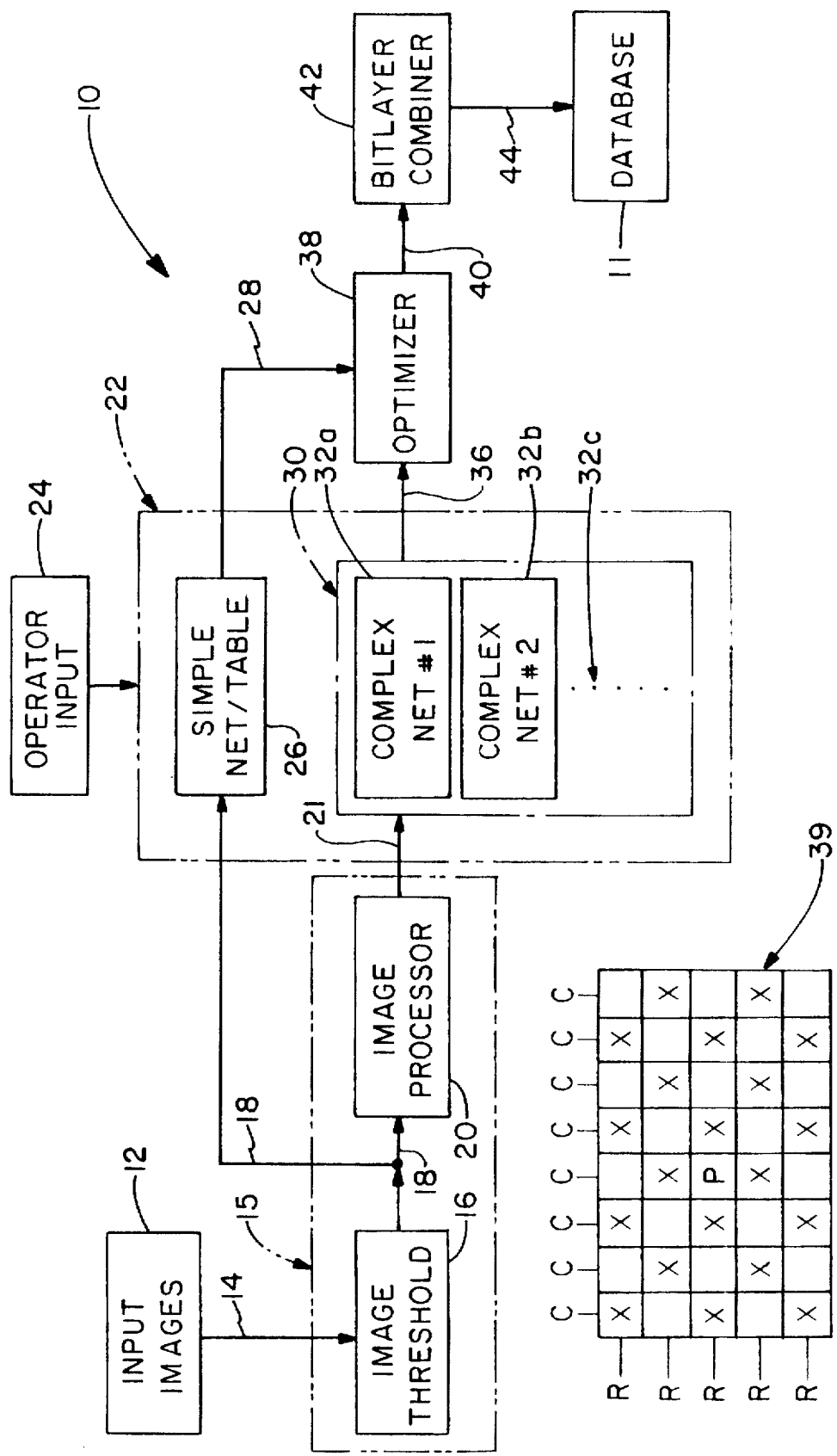
FIG. 1 is a block diagram of the present invention.

Referring now to the drawings, and in particular to FIG. 1, it can be seen that a system which includes a product and method for extracting optimal image data to generate a digital geographic database according to the present invention, is designated generally by the numeral 10. Generally, the system 10 provides the operational structure to receive a scanned image of a geographic area and to manipulate the image into a processable format of a plurality of picture elements or pixels, whereby the processable format is input into a neural network with user guided rules for classifying the processable format into a plurality of categories to generate a digital geographic database 11. The system 10 is implemented on a computer work station with the processing capabilities to convert large amounts of pictorial data into a digital image. The system 10 incorporates the necessary hardware and the necessary software in a computer-readable medium to implement the extraction method. In the preferred embodiment, a UNIX based system such as a SUN Microsystems work station is employed. In particular, the system 10 includes an input image device 12, such as a scanner, which scans an image of a geographic area such as a map, chart or other such medium into a 24-bit true color or 8-bit pseudo-color input raster file. The scanning software is configured so that a "true scan" is performed. The system 10 requires that a scanning resolution of about 250 to 300 dots per inch (DPI) for maps with widely spaced features be employed. For representations with densely packed features, particularly contour maps, a scanning resolution of between about 400 to 500 DPI is recommended. Once the geographic representation has been scanned, a corresponding signal 14 is generated by the input image device 12.

An image manipulation device 15 receives the input image signal 14 for conversion into a processable format of a plurality of pixels. In particular, the input image signal 14 is received by an image thresholder 16. The image thresholder 16 derives image data statistics collected over groups of pixels to automatically predict the presence of predetermined features contained within the representative geographic area and generates a corresponding threshold signal 18. As those skilled in the art will appreciate, thresholding is an operation in which the value of each pixel in the threshold signal 18 depends upon the value of the corresponding input pixel (input image signal 14) relative to one or more values known as thresholds. For example, the intensity and color variance of a group of pixels are employed to predict the intensity and color variance of a particular pixel within the group. Other types of thresholds employed by the thresholder 16 include, but are not limited to, the intensity and color average of a group of pixels and the intensity and color deviation of a group of pixels. Therefore, it will be appreciated that the image thresholder 16 receives the input image signal 14 to predict the presence of a plurality of predetermined area features and generates a corresponding threshold signal 18. In the preferred embodiment, the predetermined area features include such things as background, contour, roads, bodies of water and other features.

An image processor 20 receives the corresponding thresholding signal 18 for further manipulation of the input image. The image processor 20 contains subroutines for averaging pixel intensities and colors, computing pixel level differences and for color space transformations among the plurality of pixels. Those skilled in the art will appreciate that the image processor 20 filters predetermined undesired features from the threshold signal 18 and generates a corresponding process signal 21. The image processor 20 removes any spurious noise that may be present within the plurality of pixels. As such, the plurality of pixels can be segmented into various components such as color in the form of red/green/blue (RGB) components wherein each of these components is analyzed. It will further be appreciated that the RGB image can be converted into hue, saturation and intensity (HSI) components which can be analyzed at corresponding levels thereof.

A neural network 22 receives either the image threshold signal 18 or the image process signal 21 in addition to operator input 24, which includes a set of sample pixel classifications, wherein the neural network 22 classifies the plurality of pixels according to the set of sample pixel classifications to generate the digital geographic database. The neural network 22 includes a simple neural network 26 and a complex neural network 30 which includes any number of individual complex networks such as 32a, 32b and so on. In particular, the simple neural network 26 receives the threshold signal 18, whereas the complex neural network 30 receives the process signal 21. The neural network 22 generates two output signals. In particular, the simple neural network 26 generates a signal 28 and the complex neural network 30 generates a signal 36, both of which are received by an optimizer 38.

The neural network 22 is a parallel, distributed information processing structure consisting of processing elements interconnected by unidirectional channels. Each processing element within the neural network 22 has multiple inputs and a single output that can be directed to any other processing element as desired. The neural network 22 gives various weight or consideration to the processing elements so that based upon the user-guided rules of the operator input 24, the neural network 22 can ascertain trends within threshold signal 18 or process signal 21 and adjust the weight of the processing elements accordingly. In other words, the neural network 22 trains itself to determine what weighing of the processing elements should be provided and how the processing elements are best connected to classify the plurality of pixels according to predetermined area features of categories. In the preferred embodiment, the neural network 22 is a standard feed-forward/back propagate net. Preprocessing performed by the image thresholder 16 and the image processor 20 is employed to average pixel data information over differently sized areas of the processable format. As such, the neural network with the best scaling relationship to the plurality of pixels trains the fastest and most reliably. Therefore, the neural network 22 automatically determines which individual neural network 26, 32a, 32b, 32c and so on, is best suited for extracting area features or categories from the map image. By employing the neural network 22, the user is not required to explicitly define a set of processing rules. Instead, the user provides guidance by example to the neural network 22 of image categories and tests the rules the network internally devises in response.

As best seen in FIGS. 1 and 3, the checkerboard optimizer 38 receives both the signals 28 and 36 and optimizes the processing of the plurality of categories by only processing pixels arranged in a checkerboard pattern or other predetermined pattern of pixels within a plurality or matrix of pixels 39. Those pixels not included in the pattern are automatically assigned values depending upon values of neighboring pixels in the pattern. As such, the system 10 is not required to process a value for each pixel within the matrix 39. For example, if a pixel "p" is bordered on each side by pixels having the same predetermined value, pixel "p" is assigned the same predetermined value. In other words, a processed value for each pixel location is assigned to every other column within a first row and to every other column, offset by one column, within a second row, wherein the first and second rows alternate with one another to fill the entire matrix 39. Therefore, as signal 28 or signal 36 is recognized at the individual pixel level as having a predetermined value at those pixel locations designated by "x", a pixel bordered on all sides by the predetermined value is automatically assigned that predetermined value. Conversely, if an individual pixel is not bordered on all sides by the predetermined values, that individual pixel is not recognized as having the predetermined value. By testing the signals 28, 36 in this manner, the amount of processing time is correspondingly reduced. Those skilled in the art will appreciate that any other type of pattern could be employed in a similar manner to reduce the amount of processing time of the signals 28, 36. Once the optimizer operation has been completed, the checkerboard optimizer 38 generates an optimized signal 40.

Referring back to FIG. 1, a bit layer combiner 42 receives the optimized signal 40 and implements simple logic rules such as add, subtract, etc. at the single bit level, to allow the user to define a particular category or feature as being part of another category or feature. For example, if a contour line is crossing a section of forest within the optimized signal 40, the contour line can be considered as a part of the forest and as a part of the contour. In other words, specific categories can be merged with one another to produce an accurate output image for later analysis. Accordingly, the bit layer combiner 42 generates a classified image signal 44. The classified image signal 44 is then stored in the digital geographic database 11 which is employed by a user to derive desired geographic information therefrom. Of course, the digital geographic database 11 is stored in a memory device of the workstation which implements the system 10. Those skilled in the art will appreciate that each category within the geographic database 11 is stored as a single output raster file that can be separated into multiple rasters with one category per raster file. For example, the contour category can be stored in one file, the road category stored in another file and so on. This allows vectorization of single category raster files in a more efficient and effective manner.

Figure 2:
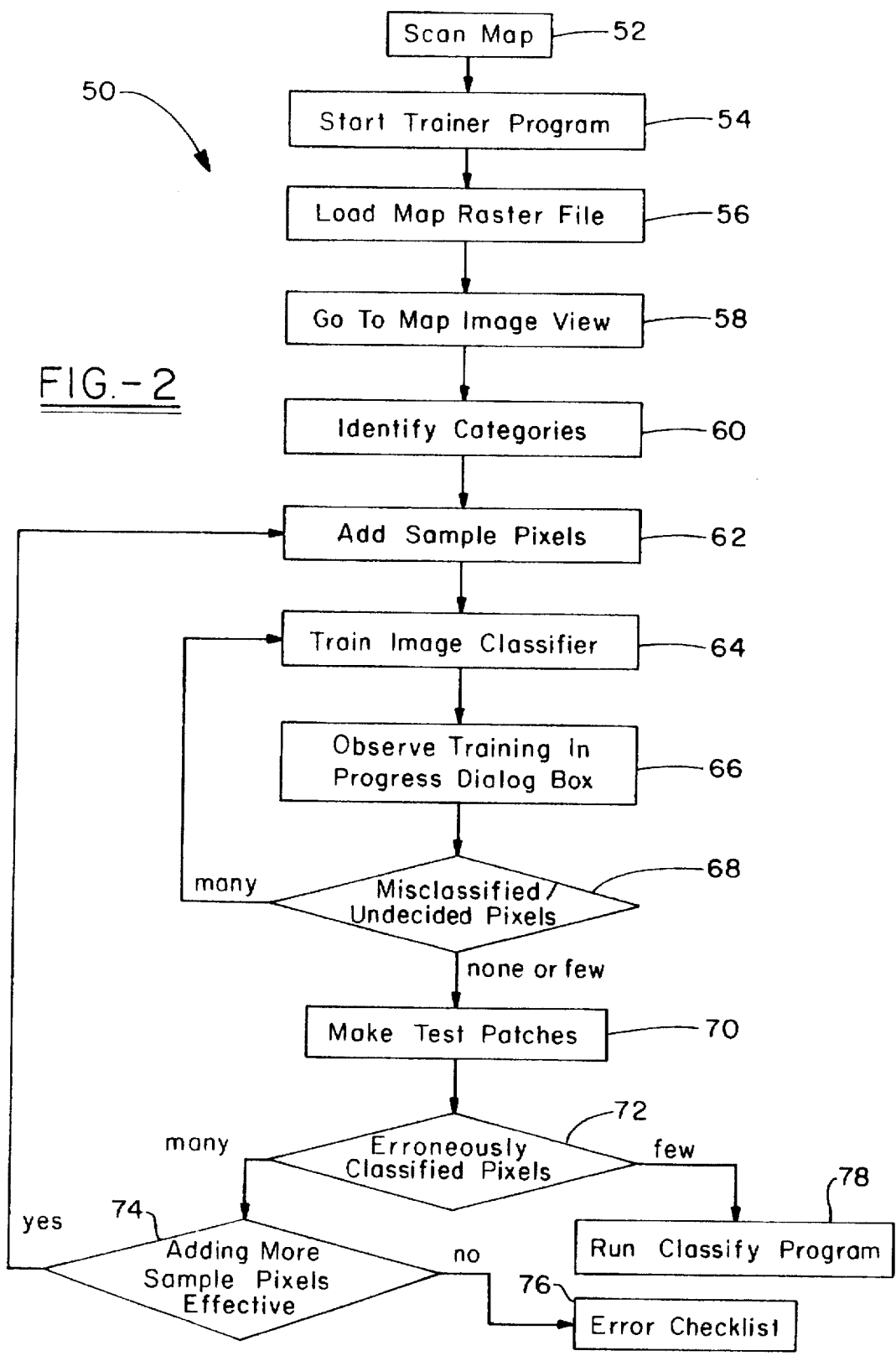
FIG. 2 is a flow chart illustrating the operation steps of the user of the present invention.

In operation, the system 10 provides a process, which is designated generally as the numeral 50 in FIG. 2, by which a hard copy map or other paper representation of a geographic area is processed to generate a digital geographic database 11. At step 52, the user scans a representation of a geographic area into a UNIX system database. The map scans can be 24-bit true color or 8-bit pseudo-color images. In the preferred embodiment, the 24-bit true color image is employed and the scanning software is set so that a "true scan" is performed. As such, no gamma-correction or other filtering techniques are applied by the scanning software. As discussed previously, maps with widely spaced features require that a scanning resolution of between 250 to 300 dots per inch (DPI) be employed. For maps with densely packed features, especially contour type maps, require a scanning resolution of between 400 and 500 DPI.

Next, at step 54, the user starts a trainer program provided by the process 50. Afterwards, at step 56, the process 50 loads a map raster file wherein the representation of the scanned geographic area is converted to a plurality of pixels with a size of 600×600 picture elements. This overview image of the geographic area is then displayed on the screen of the computer work station.

At step 58, the user designates a specific area within the overview image for designation as a map image view. It will be appreciated that this map image view contains a sampling of all the categories and/or predetermined features desired for later analysis of the digital geographic database 11.

At step 60, the user identifies categories in the representation of the geographic area attributable to predetermined features, such as map background, contour lines, roads, vegetation, buildings, bodies of water, streams or any other desired category with predetermined features. In the preferred embodiment, up to eight categories can be designated, although it will be appreciated that other categories could be defined when extracting information from the geographic image. Besides identifying each category by a descriptive word identifier, such as "road," a symbolization color and a code value are assigned thereto. The symbolization colors are employed to represent the visual output of the process so as to effectively group the features belonging to each specific category. For example, the system 50 identifies roads by displaying all road pixels as yellow. It will farther be appreciated that these color designations are not necessarily the actual color of the map features. The code values represent the digital encoding employed in the geographic database 11 and which allow the searching thereof at a later time.

At step 62, the user identifies sample pixels having the various predetermined features. Sample pixels are selected that are on the interior and at the edges of each specific feature. This allows the system 10 to accurately identify various features within the scanned geographic area. By identifying categories and selecting sample pixels, the user is providing the operator input or user-guided rules 24 employed by the neural network 22 as discussed previously. As will be discussed later, the process 50 allows for the correction of designated sample pixels to their appropriate categories if they have been misidentified.

At step 64, the user initiates a program for training an image classifier to identify remaining unselected pixels as having the predetermined features of the desired categories. The image training program of the classifier performs a series of iterations by submitting the user selected sample pixels through the neural network 22 to correlate each map image pixel to a specific feature category. The training program proceeds through the cycle of iterations and determines which pixels are correctly classified, misclassified and those pixels as to which no determination could be made, i.e. undecided pixels. A correctly classified pixel is a sample pixel that is classified by the image classifier with greater than 80 percent confidence as being a member of the correct category. A misclassified pixel is a sample pixel that is classified with greater than 80 percent confidence as being a pixel identified with a wrong category. An undecided classified pixel is a sample pixel which the image classifier has less than 80 percent confidence as being a member of either the correct or misclassified category. Once the image classifier correctly identifies the sample pixels as belonging to a correct category, convergence occurs. Convergence is that point at which the most pixels are correctly classified and the error is the lowest. At step 66, the user observes the results of each iteration by reviewing a training in progress dialog box displayed on the computer workstation screen.

At step 68, the process 50 determines whether there is an excessive number of misclassified or undecided pixels. If this is the case, the process 50 returns to step 64 so that the image classifier can be retrained. Convergence can be accomplished at the retraining step 64 by increasing the number of iterations, deleting those pixels that are misclassified or undecided, or by resetting the image classifier to an initial randomized state. However, if at step 68 it is determined that there are none or few misclassified or undecided pixels, the process 50 proceeds to step 70.

At step 70, the user designates test patches on the map image view to test the performance of the trained image classifier. This is done by the user randomly selecting large areas of the desired categories so that the corresponding pixels are colorized according to the symbolization colors established for the predetermined categories. At step 72 the user views the test patches and determines if there is a large number of erroneously classified pixels. If this is the case, at step 74, the process 50 determines if adding more sample pixels would be effective in reducing the number of erroneously classified pixels. As such, the process 50 returns the user to step 62 to do just that. At this time, the user selects more sample pixels from the test patch in which there appears to be a specific problem of erroneously classified pixels. However, if at step 74 it is determined that adding more sample pixels is ineffective, the process 50 proceeds to step 76. At step 76 the user is instructed as to the various types of errors that could conceivably be causing the excessive number of erroneously classified pixels. These errors include, but are not limited to, insufficient separation between features, joined contour lines, excess noise and in particular lone pixels that are classified differently than neighboring pixels, erroneous classification on one edge of particular features, misclassification of certain categories, and a high number of misclassified and undecided pixels. To overcome these types of problems the user is instructed to initiate corrective action including but not limited to using a higher scanning resolution when scanning the hard copy representation, re-identifying specific pixels within a group of pixels, adding sample pixels along the edge of features that are not properly recognized, checking the performance of the scanning device, retraining the image classifier after adding additional sample pixels and so on. After these corrective steps are taken, process 50 is restarted at step 52.

If at step 72 it is determined that there are few or a limited number of erroneously classified pixels, the process proceeds to step 78 where the user runs the classify program. The classify program applies the image classifier i.e. the trained neural networks 22 with operator input or user-guided rules 24, to an entire input image raster file. Once the entire raster file has been classified, the plurality of pixels are designated according to their predetermined features so that a digital geographic database 11 is generated. It will be appreciated that the classified program stores the digital geographic database 11 in a format accessible by other computer programs according to the predetermined features and categories. Once the system 10 has generated a geographic database 11, a user can search the database for selected geographic features to assist in finding particular locations within the geographic representation.

Based upon the foregoing, it will be appreciated that the system 10 and corresponding process 50, implemented in a computer readable medium, provide numerous advantages over previous methods of converting a hard copy map image into a digital geographic database. In particular, the amount of user time attempting to classify certain features within a hard copy map is greatly reduced by virtue of training an image classifier with a few selected pixels to designate that entire feature within the representation of the geographic area. The process also provides an advantage in that it easily interfaces with color based extraction methods to insure a relatively easy transition to new methods of extracting data. The present system also provides the advantage of having an operator interface and training system that simplifies the category extraction process rather than increasing its complexity. It will also be appreciated that the image classifier program can be used with similar types of map formats.

Thus it can be seen that the objects of the invention have been attained by the structure and methodology presented above. While in accordance with the patent statutes only the best mode and preferred embodiment of the invention has been presented and described in detail, the invention is not limited thereto or thereby. Accordingly, for an appreciation of the true scope and breadth of the invention, reference should be made to the following claims.

What is claimed is:

1. A method for extracting image data of area features to generate a digital geographic database, comprising the steps of:

scanning an image of a geographic area which provides area features of non-uniform shape that are adjacent to and overlap one another, wherein like area features vary in shape and size and wherein different area features may have the same shape and size;

manipulating said image by designating select pixels within said area features to symbolization colors to generate a processable format of a plurality of pixels which correspond to the various area features;

receiving said processable format into a neural network which establishes user-guided rules based upon the designated select pixels to ascertain trends related to said plurality of pixels within said processable format, said neural network classifying said processable format of a plurality of pixels into a plurality of categories corresponding to the area features to generate a digital geographic database.

2. The method according to claim 1, wherein said step of manipulating comprises:

thresholding said image to predict the presence of said plurality of categories and generating a corresponding thresholding signal.

3. The method according to claim 2, wherein said step of manipulating further comprises:

processing said thresholding signal to filter undesired features from said plurality of pixels and generating a corresponding processing signal.

4. The method according to claim 3, wherein said step of receiving includes receiving one of said thresholding signal and said processing signal, and an input signal having a set of sample pixel classifications, wherein said neural network classifies said plurality of pixels according to said set of sample pixel classifications to generate said geographic database and wherein said neural network is a feed forward/back propagate network.

5. The method according to claim 4, further comprising the steps of:

optimizing the processing of said plurality of categories by processing values for pixels arranged in a predetermined pattern and assigning values to those pixels bordered by pixels of said predetermined pattern having the same value;

combining said plurality of categories where said plurality of categories intersect; and assigning to the intersection of the plurality of categories a predetermined value derived from said input signal.

6. The method according to claim 3, wherein said step of receiving includes receiving said thresholding signal and an input signal having a set of sample pixel classifications, wherein a simple neural network classifies said plurality of pixels according to said plurality of categories to generate said geographic database and wherein said neural network is a feed forward/back propagate network.

7. The method according to claim 3, wherein said step of receiving includes receiving said processing signal and an input signal having a set of sample pixel classifications, wherein one of a plurality of complex neural networks classify said plurality of pixels according to said set of sample pixel classifications to generate said geographic database and wherein said neural network is a feed forward/back propagate network.

8. A method for generating a digital geographic database comprising the steps of:

scanning a representation of a geographic area, which provides area features of non-uniform shape that are adjacent to and overlap one another, wherein like area features vary in shape and size and wherein different area features may have the same shape and size and wherein said representation is converted to a plurality of pixels;

identifying by a user a plurality of categories in said representation attributable to corresponding predetermined features;

identifying and designating by a user sample pixels associated with said predetermined features into distinct symbolization colors;

training an image classifier to identify remaining pixels as having predetermined features corresponding to said identified and designated sample pixels, wherein said image classifier ascertains trends related to said identified and designated sample pixels for the purpose of converting remaining pixels in said predetermined features into the symbolization colors; and classifying said plurality of pixels according to the predetermined features to generate a digital geographic database.

9. The method according to claim 8, further comprising the steps of;

determining by a user if any sample pixels are misidentified with respect to said predetermined features;

correcting by a user said sample pixels that are misidentified into the proper symbolization color; and retraining said image classifier.

10. The method according to claim 9, further comprising the steps of:

testing said image classifier to determine if any sample pixels are erroneously classified;

correcting by a user said sample pixels erroneously classified into the proper symbolization color; and retraining said image classifier.

11. The method according to claim 10, further comprising the step of:

storing said digital geographic database in a format that is searchable by said predetermined features, wherein said format includes single output raster files for each of said predetermined features.

12. The method according to claim 8, further comprising the step of:

optimizing the processing of said plurality of pixels according to the predetermined features by only processing pixels arranged in a predetermined pattern and assigning a value to those pixels not in the predetermined pattern a value of neighboring pixels in the pattern.

13. A computer-readable medium for extracting image data from geographic representations to generate a digital geographic database, comprising:

means for manipulating an image of a geographic area stored in a processable format of a plurality of pixels wherein the geographic area provides area features of non-uniform shape that are adjacent to and overlap one another, wherein like area features vary in shape and size and wherein different area features may have the same shape and size;

means for converting sample pixels within said plurality of pixels associated with area features into respective symbolization colors;

means for receiving said processable format into a neural network, wherein said neural network generates user-guided rules based upon conversion of said sample pixels within said processable format attributable to predetermined features and ascertains trends related to conversion of said sample pixels in said processable format;

means for training said neural network utilizing the user-guided rules to classify said processable format according to the predetermined features corresponding to area features; and means for storing the classified processable format into a digital geographic database searchable by a user.

14. The computer-readable medium according to claim 13, further comprising:

means for optimizing the classifying of said processable format by processing values for pixels arranged in a predetermined pattern and assigning the same value to those pixels bordered on at least two sides by pixels of said predetermined pattern.

15. The method according to claim 14, wherein said means for storing includes means for separating each category into a single raster file to allow for vectorization of said single raster file and to allow for comparison with any other single raster file.

16. A method for extracting image data to generate a digital geographic database, comprising the steps of:

scanning an image of a geographic area;

manipulating said image to generate a processable format of a plurality of pixels;

receiving said processable format into a neural network user-guided rules for classifying said processable format into a plurality of categories; and optimizing the processing of said plurality of categories by processing values for pixels arranged in a predetermined pattern and assigning the same value to those pixels bordered by pixels of said predetermined pattern to generate a digital geographic database.

* * * * *